INVENTORS.
RALPH W. CRAWFORD
PAUL A. MARTIN

THEIR ATTORNEYS.

INVENTORS.
RALPH W. CRAWFORD
PAUL A. MARTIN
BY
THEIR ATTORNEYS.

INVENTORS.
RALPH W. CRAWFORD
PAUL A. MARTIN
BY
THEIR ATTORNEYS.

Jan. 20, 1970   R. W. CRAWFORD ET AL   3,490,171
TOY VIEWER SIMULATING A FLASH CAMERA AND INCLUDING A SOUNDER
Filed Dec. 21, 1967   7 Sheets-Sheet 5

INVENTORS.
RALPH W. CRAWFORD
PAUL A. MARTIN
BY
THEIR ATTORNEYS.

INVENTORS.
RALPH W. CRAWFORD
PAUL A. MARTIN
BY
THEIR ATTORNEYS.

INVENTORS.
RALPH W. CRAWFORD
PAUL A. MARTIN
THEIR ATTORNEYS.

United States Patent Office 3,490,171
Patented Jan. 20, 1970

3,490,171
TOY VIEWER SIMULATING A FLASH CAMERA AND INCLUDING A SOUNDER
Ralph W. Crawford and Paul A. Martin, East Aurora, N.Y., assignors to Fisher-Price Toys, Inc., East Aurora, N.Y., a corporation of New York
Filed Dec. 21, 1967, Ser. No. 692,388
Int. Cl. A63h 5/00
U.S. Cl. 46—175                                     34 Claims

ABSTRACT OF THE DISCLOSURE

A camera viewer toy includes: a rotatable transparent disk; a viewing aperture; a ratchet on the disk and a pair of pawls on a plunger-operated arm for stepping the disk in rotation to register the transparencies successively with the viewing aperture; a simulated flash cube turned by the arm one quarter turn for each advancement of the disk; and a simulated lens of a transparent, concave-convex member backed by an opaque, black disk. The toy may make a clicking sound when operated.

---

This invention relates to a camera viewer toy, and its objects include, without limitation, a camera viewer toy that:

(a) entertains children and is a desirable toy;
(b) simulates an actual camera in an attractive way;
(c) teaches children to associate symbols, pictures, and movements;
(d) is manipulatable, has moving parts, and provides an opportunity for varied play experience;
(e) is rugged, durable, reliable, safe, and able to long withstand rough play; and
(f) is economical to manufacture and competitive with existing toys.

These and other objects of the invention will be apparent hereinafter from the specification which describes the invention, its use, operation, and preferred embodiment, from the drawings, which constitute a part of the disclosure, and from the subject matter claimed.

Generally, the inventive camera viewer toy includes a body having the general size and shape of a camera, a viewing aperture through the body, a rotatable disk intersecting the viewing aperture and having transparent viewable scenes arranged concentrically for registry with the viewing aperture, means for advancing the disk to bring the scenes successively into registry with the viewing aperture for viewing, a polygon mounted above the toy body, and means for rotating the polygon in stepped rotation with the viewing disk. The polygon is preferably a cube to simulate a rotatable flash cube, and pawls and ratchets are preferred for stepped rotation of the viewing disk and the polygon. The toy also preferably includes a lens in the viewing aperture, a manually rotatable lens housing with click stop positions and a simulated lens, indicia on the viewer disk displayed in an aperture communicating with the periphery of the disk and a second viewing aperture intersected by a disk having different-colored, transparent, regions for changing the tint of the view. The disk advancing means preferably comprises a pivotal arm, a ratchet on the disk, a pair of pawls extending from the arm into engagement with the ratchet, and a vertical plunger in sliding engagement with the free end of the arm for pivoting the arm to advance the disk by steps. Preferably, another pawl is formed on an extension of the arm for engaging a ratchet to turn a rod on which the polygon is mounted for turning the polygon in stepped rotation with the disk.

The illustrated embodiment of the inventive toy shows the details of a commercially successful toy having many features as described below. Many combinations of the disclosed features are possible within the spirit of the invention, and those skilled in the art will appreciate that the claimed invention is not limited to the specific structure illustrated.

The general configuration of the illustrated preferred embodiment of the inventive toy 25 is best shown in FIGS. 1–4. The main body 26 of toy 25 is shaped and sized to simulate a camera and is formed of a front portion 27 of molded plastic and a rear portion 28 of wood. Front body portion 27 is nailed to rear body portion 28 by nails 29. A molded plastic element 32 simulating a light meter window and a lens housing 30 containing a simulated lens 31 are each secured to the front of body portion 27. A cube 33 simulating a flash cube is mounted on top of body 26, and an actuator plunger 34 extends above body 26.

Body 26 contains a viewing disk 35 mounted for stepped rotation, a translucent viewing window 36, and a lens 37 surrounded and protected by eyepiece 101 for viewing transparent scenes in disk 35. Body 26 also has a rear housing 40 secured to body portion 28 by nails 41 and providing another viewing aperture 38 that is intersected by disk 39 containing different colored windows for changing the color or tint of the view through body 26. An aperture 100 is formed through front body portion 26 within the periphery of disk 35, and indicia on disk 35 are displayed in window 100 as disk 35 is stepped through its sequence of positions.

Figure 1:
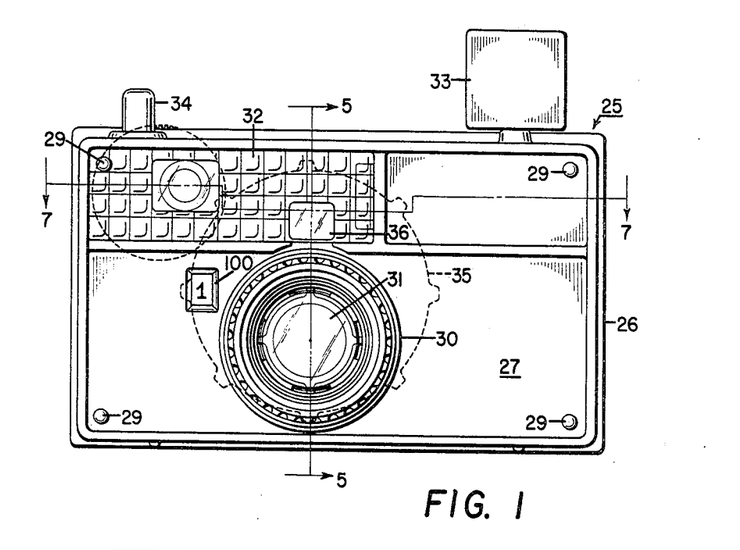
FIG. 1 is a front elevation of a preferred embodiment of the inventive camera viewer toy.
Figure 2:
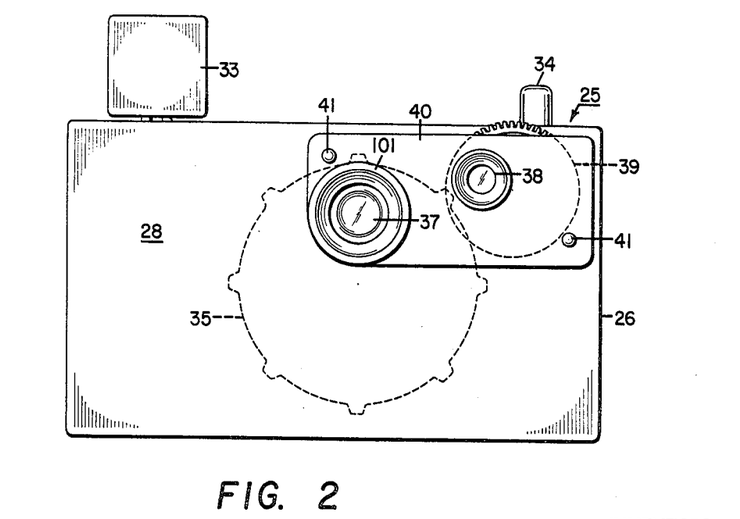
FIG. 2 is a rear elevation of the toy of FIG. 1.
Figures 3, 4, 5:
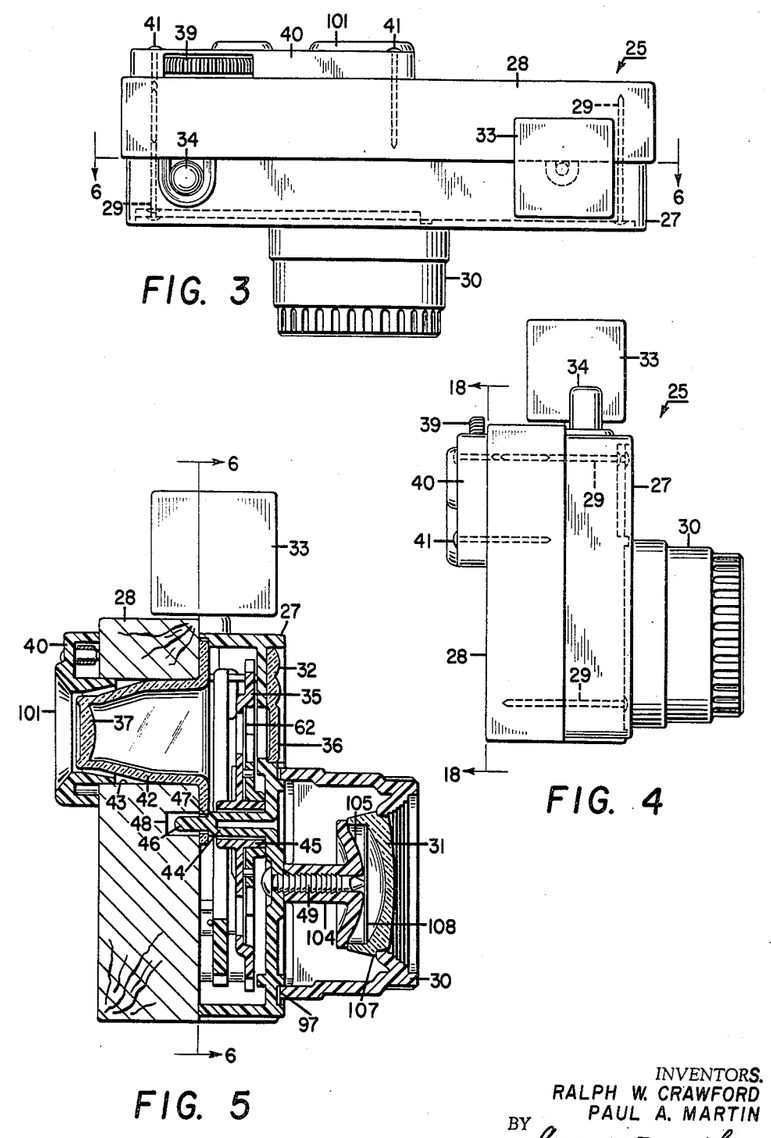
FIG. 3 is a plan view of the toy of FIG. 1.
FIG. 4 is a side elevation of the toy of FIG. 1.
FIG. 5 is a cross section of the toy of FIG. 1 taken along the line 5—5 thereof.
Figure 6:
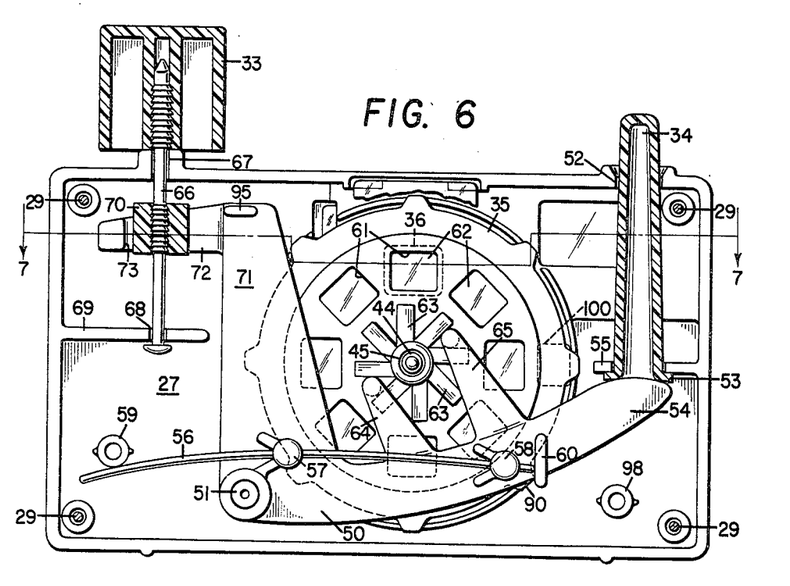
FIG. 6 is a partially cut-away cross section of the toy of FIGS. 1–5 taken along the lines 6—6 of FIGS. 3 and 5.
Figure 7:
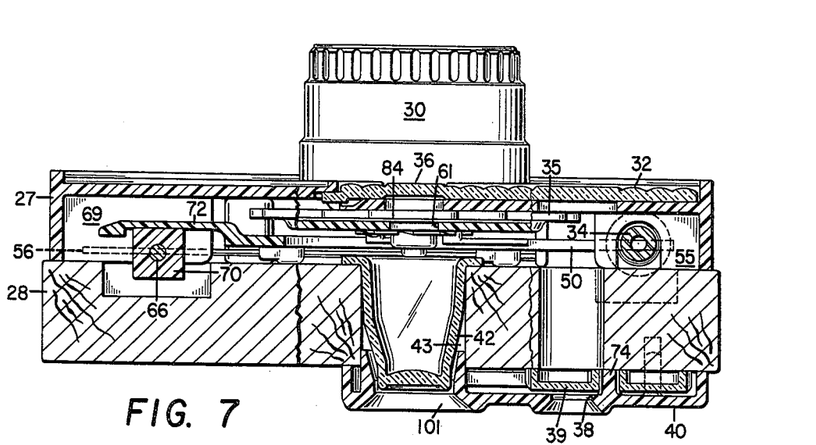
FIG. 7 is a cross section of the toy of FIGS. 1–6 taken along the line 7—7 of FIGS. 1 and 6.

The cross section views of FIGS. 5–7 best show the working structure of the illustrated toy 25, and its parts are best detailed in FIGS. 18–29. As best shown in FIGS. 5, 7, 23, and 24, lens 37 is formed in hollow viewer piece 42 housed in viewing aperture 43 extending through rear body portion 28 to the region of eye piece 101 in rear housing 40. Light passes through translucent viewing window 36, a transparent scene 62 in disk 35, viewer piece 42, and lens 37, for viewing scenes 62. Front body portion 27 includes a rearwardly extending journal 44 on which the hub 45 of disk 35 is mounted. An extension 46 of journal 44 projects through an aperture 47 in viewer piece 42 and into a recess 48 in rear body portion 28 to fix the relationship of these members.

Lens housing 30 and its simulated lens 31 are best shown in FIGS. 5 and 25–29. Lens housing 30 is generally barrel-shaped to simulate an actual camera lens housing, and is formed with base spokes 103 joining a tubular sleeve 104. A nail 49 driven through the front face of body portion 27 and into sleeve 104 secures housing 30 rotatably to the front of body portion 27. The forward end of tube 104 opens into a walled recess 105 which receives lens 31. Projections 106 are formed around the inside perimeter of recess 105 for snap fitting with ridge 107 around lens element 31.

Figure 28:
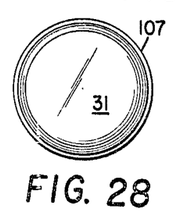
FIG. 28 is a front elevation of a simulated lens for the illustrated toy.
Figure 29:
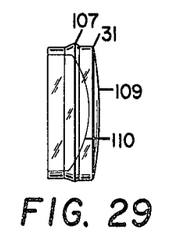
FIG. 29 is a side elevation of the simulated lens of FIG. 28.

Lens element 31 is formed of transparent plastic material with an inner concave surface 110 and an outer convex surface 109. The convex front surface 109 has a different radius of curvature from concave rear surface 110 to provide different reflected images. A disk of black paper 108 is placed behind surface 110 and lens element 31 is snap fit in place in recess 105 in housing 30. Black, opaque disk 108 prevents any light transmission from recess wall 105 outward through lens element 31, and makes lens element 31 appear to open on a darkened depth so as to simulate the appearance of an actual camera lens. At the same time, reflecting surfaces 109 and 110 reflect faint images that are different to heighten the optical simulation of the lens appearance.

The rear surface of lens housing 30 is formed with notches 96 for engaging a ridge 97 (FIG. 5) on front body portion 27. Notches 96 and ridge 97 provide click stop positions for lens housing 30 as it is manually rotated.

An actuator arm 50, formed of resilient, plastic material, is pivotally mounted on journal 51 on front body portion 27 for actuating movable parts of the illustrated toy 25. Actuator plunger 34 slides vertically in recess 52, and its lower end 53 is flared out and engages the free end 54 of arm 50. The end 54 of arm 50 is rounded as illustrated for smooth, sliding contact with the hollow flare 53 of plunger 34. Recessed abutment 55 is formed on front body portion 27 to engage the upper surface of the flared lower end 53 of plunger 34 to limit its upward travel. A spring 56 extends through apertured studs 57 and 58 on arm 50, and the free end of spring 56 engages stud 59 which also serves as a location peg for aligning front body portion 27 with rear body portion 28. An abutment 60 on arm 50 limits endwise motion of spring 56 to insure that it cannot slip off stud 59. Spring 56 thus biases arm 50 counter clockwise as illustrated in FIG. 6, to raise its free end 54 upward into contact with plunger 34 to the illustrated stop position.

Figure 19:
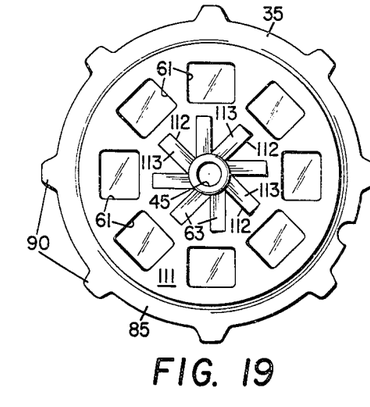
FIG. 19 is a rear elevation of the viewing disk of the inventive toy.
Figure 20:
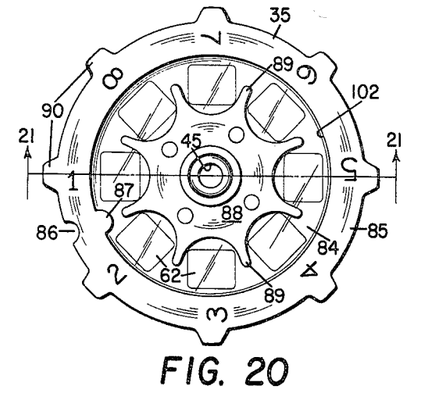
FIG. 20 is a front elevation of the viewing disk of FIG. 19.
Figures 21, 22:
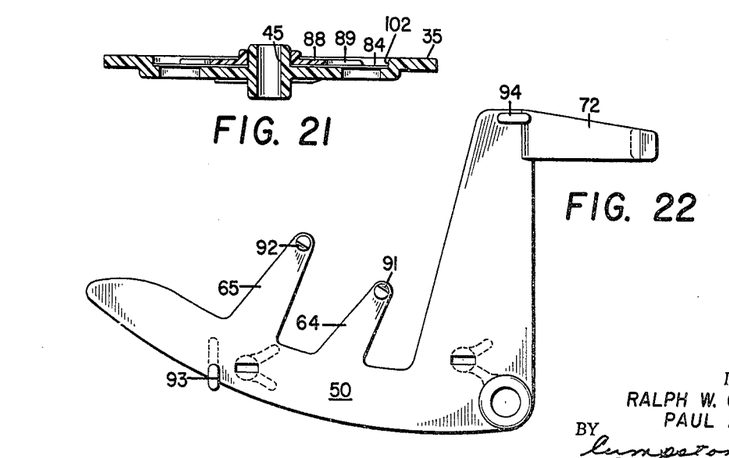
FIG. 21 is a cross section view of the disk of FIG. 20 taken along the line 21—21 thereof.
FIG. 22 is a front elevation of the action arm of the illustrated toy.
Figure 23:
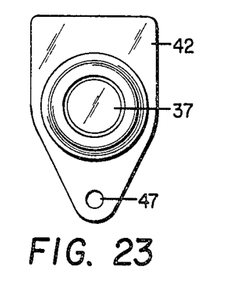
FIG. 23 is a front elevation of the viewer eye piece for the illustrated toy.
Figure 24:
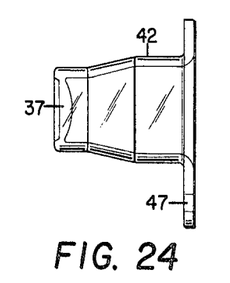
FIG. 24 is a side elevation of the viewer piece of FIG. 23.
Figure 25:
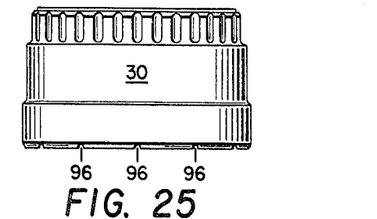
FIG. 25 is a side elevation of a lens housing for the illustrated toy.
Figure 26:
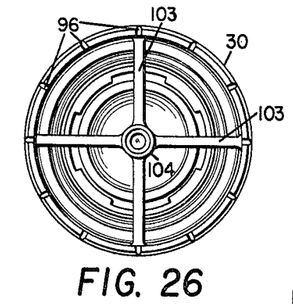
FIG. 26 is a rear elevation of the lens housing of FIG. 25.
Figure 27:
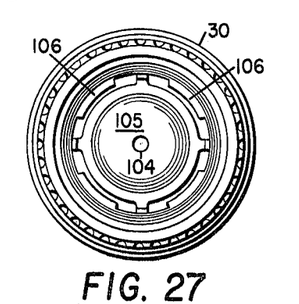
FIG. 27 is a front elevation of the lens housing of FIG. 25.

FIGS. 19–21 best show details of viewing disk 35. Disk 35 includes a hub 45, a rim 85, and a rear wall 111 extending between hub 45 and rim 85 and forming an annular recess 102 in the front face of disk 35. A plurality of apertures 61 are formed in wall 111 concentrically with hub 45, and a circular film transparency 84 is secured in recess 102. Transparency 84 has concentric, viewable scenes 62 registered with apertures 61 in wall 111. Location notch 86 and ridge 87 insure proper registry of film disk 84 with the hub 85 of disk 35.

A retainer plate 88 is secured over film disk 84 to retain film disk 84 in place and includes fingers 89 extending between scenes 62 to separate such scenes and to hold the periphery of film disk 84 flat in place. Stop plugs 90 are formed around the periphery of hub 85 to locate disk 35 accurately in registry with viewing window 36 for each advancement step. Also, rim 85 is provided with numbers opposite each viewable scene 62, and such numbers are registered in viewing window 100 (FIG. 1) in the stepped positions of disk 35.

Ratchet teeth 63 are formed on rear wall 111, and each tooth 63 is formed of a front edge 112 rising sharply from rear wall 111 and a sloping rear face 113 extending obliquely to the surface plane of rear wall 111. The shape of each tooth 63 is best shown in the cross section views of FIGS. 11–14.

Cube 33 is mounted on rod 66 which extends through a recess 67 in the top of front body portion 27 and is loosely held for rotation by a recess 68 formed in location wall 69 on front body portion 27. Rod 66 bears a ratchet member 70 having four corners 114 and four flat faces 115. Actuator arm 50 has an extension 71 bearing a resilient pawl 72 having a hook portion 73 for engaging the corners 114 of ratchet 70 and a flat face 99 for engaging the flat surfaces 115 of ratchet 70. Pawl 72 is held in resilient engagement with ratchet 70 by guide projections 94 and 95 on actuator arm 50, and turns ratchet 70 and cube 33 a quarter turn for each advancement step of disk 35. The operation of pawl 72 and ratchet 70 is more fully described below.

Figure 18:
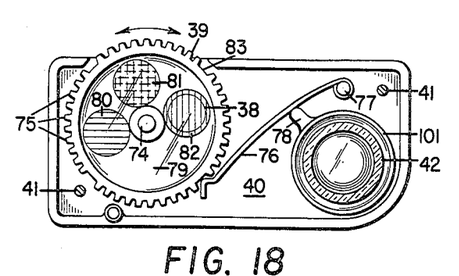
FIG. 18 is a cross sectional view of the toy of FIG. 4 taken along the line 18—18 thereof.

FIG. 18 shows the inside of rear housing 40 containing disk 39 mounted for rotation on journal 74. The periphery of disk 39 extends above housing 40 and has teeth 75 that are engaged by the free end of cantilever spring 76 mounted on pin 77 and biased toward engagement with disk 39 by abutment 78 extending from the inside of eyepiece 101. Disk 39 contains a clear transparent area 79 and three areas 80–82 of different colored, transparent materials. Disk 39 can be rotated to bring each of its viewing areas or sectors 79–82 into successive registry with viewing aperture 38 to provide different tinted views through the body 26 of toy 25.

Four teeth are missing from the periphery of disk 39 to provide click stop location points 83 so that disk 39 can be conveniently stopped with one of its viewing areas 79–82 in proper registry with viewing apertures 38. During rotation, spring 76 makes a clicking noise against the teeth 75 of disk 39.

FIG. 22 shows a rear elevation of actuator arm 50. The tips of pawls 64 and 65 have respective bevelled surfaces 91 and 92 as illustrated for proper engagement with ratchet teeth 63 on viewer disk 35. An abutment stop 93 extends from action arm 50 for engaging stop lugs 90 on viewer disk 35 to accurately locate disk 35 in each advancement step. Spacing projection 94 on extension 71 of action arm 50 rides against a surface of front body portion 27 for accurate location and biasing of pawl 72 against its ratchet 70. A similar spacing projection 95 extends rearwardly from extension 71 for engagement with rear body portion 28. Spacers 94 and 95 are well shown in FIGS. 15–17.

Figure 8:
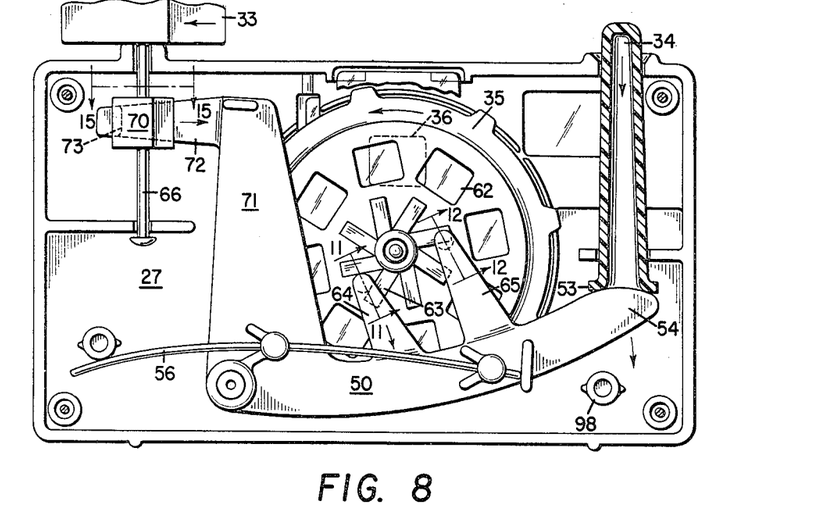
FIGS. 8–10 are partially cut-away cross sectional views taken in the same plane as the view of FIG. 6 and showing different positions of action members of the toy of FIGS. 1–7.
Figure 9:
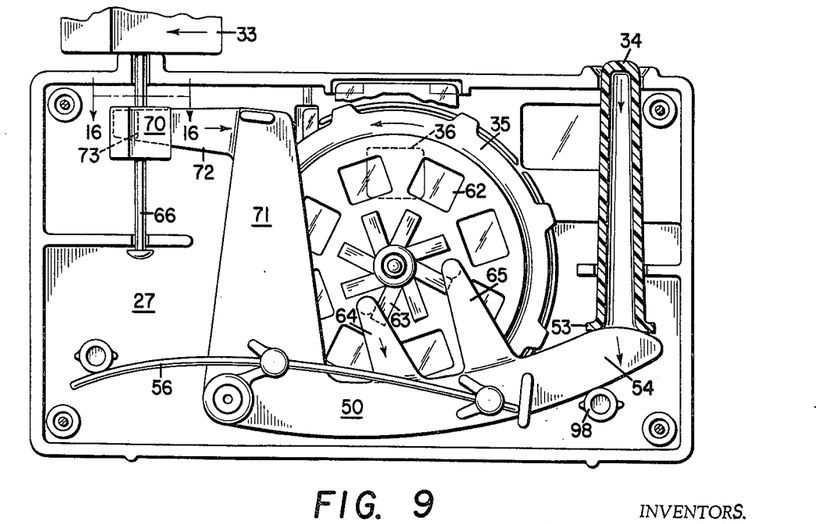
Figure 10:
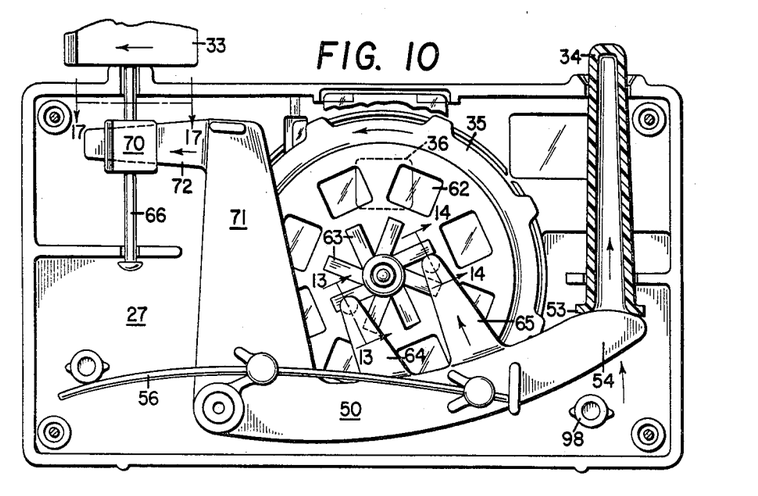
Figure 11:
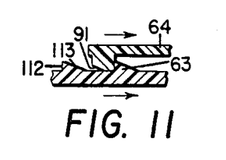
FIG. 11 is a partial cross section view of the toy of FIG. 8 taken along the line 11—11 thereof.
Figure 12:
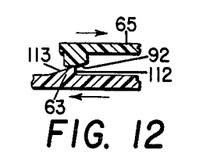
FIG. 12 is a partial cross section of the toy of FIG. 8 taken along the line 12—12 thereof.
Figure 13:
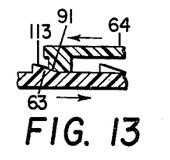
FIG. 13 is a partial cross section view of the toy of FIG. 10 taken along the line 13—13 thereof.
Figure 14:
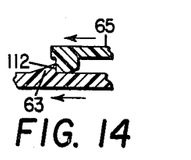
FIG. 14 is a partial cross section view of the toy of FIG. 10 taken along the line 14—14 thereof.

The working mechanism of toy 25 is shown in rest position in FIG. 6. FIGS. 8–10 show an operating sequence for the illustrated toy, and FIGS. 11–17 show additional details of such operation.

FIG. 8 shows actuator plunger 34 moving downward against and sliding along the free end 54 of actuator arm 50 to pivot arm 50 clockwise as shown by the arrow. Pawl 64 engages the upright edge 112 of a ratchet tooth 63 on disk 35 during such downward motion of arm 50 to rotate disk 35 an increment in a counterclockwise direction as illustrated and shown by the arrow on disk 35. The action of pawl 64 against ratchet 63 is shown in the partial cross section view of FIG. 11. At the same time, pawl 65 rides up the inclined rear surface 113 of another ratchet tooth 63 with the bevelled edge 92 of pawl 65 foremost as shown in the cross section view of FIG. 12.

In the position illustrated in FIG. 9, actuator plunger 34 has moved to its lowest position with the free end 54 of actuator arm 50 engaging location stud 98 limiting the downard pivotal motion of actuator arm 50. In such position, disk 35 has been rotated further in a counterclockwise direction by pawl 64 as illustrated.

FIG. 10 shows upward movement of action arm 50 under the bias of spring 56, with actuator plunger 34 rising as indicated by the arrow. With such motion, pawl 65 engages the sharp edge 112 of a ratchet tooth 63 as shown in the cross section view of FIG. 14 to rotate disk 35 further in a counter clockwise direction as shown by the arrow in FIG. 10. At the same time, pawl 64 rides up the sloping rear face 113 of a ratchet tooth 63 with bevelled edge 91 foremost as shown in the cross section view of FIG. 13 to took over the next ratchet tooth 63 for a succeeding actuation.

As the mechanism returns to the rest position illustrated in FIG. 6 with actuator plunger 34 and the free end 54 of actuator arm 50 fully elevated. disk 35 is moved one complete step to bring a succeeding view 62 into registry with viewing window 36. Such registry is assured by a stop lug 90 on disk 35 engaging abutment 93 on the forward face of actuator arm 50.

Figure 15:
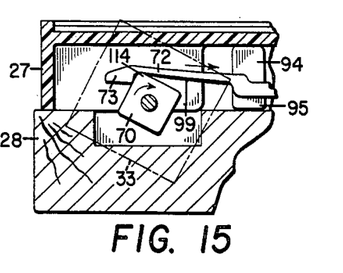
FIG. 15 is a partial cross section view of the toy of FIG. 8 taken along the line 15—15 thereof.

At the same time the above described disk advancement is occurring, cube 33 is rotated one quarter turn. From the rest position shown in FIG. 6, actuator plunger 34 is moved downward to the position illustrated in FIG. 8, causing a clockwise pivotal motion of action arm 50. This also moves resilient pawl 72 and its hook 73 to the right as indicated by the arrow. As best shown in FIG. 15, a corner 114 of ratchet 70 is engaged by hook 73 so that ratchet 70 is turned by such motion.

Figure 16:
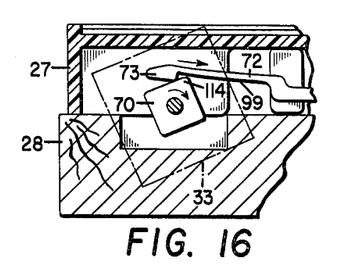
FIG. 16 is a partial cross sectional view of the toy of FIG. 9 taken along the line 16—16 thereof.
Figure 17:
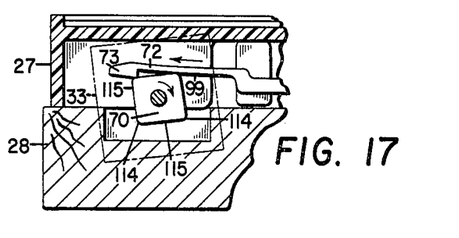
FIG. 17 is a partial cross sectional view of the toy of FIG. 10 taken along the line 17—17 thereof.

As motion of actuator arm 50 is continued to the limit position illustrated in FIG. 9, hook 73 of pawl 72 turns ratchet 70 to the position illustrated in FIGS. 9 and 16. On the upward return of actuator arm 50 as illustrated in FIG. 10, pawl 72 moves to the left as indicated by the arrow, and the flat face 99 of pawl 72 slides across flat surface 115 of ratchet 70 as shown in FIG. 17 to square ratchet 70 and cube 33 with the front face of the toy to complete a 90°, one-quarter turn for cube 33.

Thus, it can be seen, that the illustrated toy accomplishes the objects of the invention. Those skilled in the art will appreciate that the camera body, and its working mechanisms can have a variety of shapes and can be embodied in different materials within the spirit of the invention. Parts can be secured together in different ways and different features can be combined in a single toy. The drawings show a practical and commercially successful embodiment of the inventive toy, but the invention is not limited to the details of this construction.

Other features, advantages, and other specific embodiments of this invention will be apparent to those exercising ordinary skill in the pertinent art after considering the foregoing disclosure.

We claim:
1. A camera viewer toy comprising:
(a) a body configured to have the general size and shape of a camera;
(b) said body being formed with a viewing aperture extending therethrough;
(c) a rotatable disk mounted within said body;
(d) a plurality of viewable scenes arranged concentrically around said disk;
(e) means for advancing said disk in stepped rotation to bring successive ones of said scenes into registry with said viewing aperture for viewing;
(f) a polygon mounted for rotation above said body; and
(g) means interacting with said advancing means for rotating said polygon in stepped rotation with said disk.

2. The toy of claim 1 wherein said polygon is a cube mounted closely over the top of said body and rotated one quarter turn for each advancement step.

3. The toy of claim 1 including a rotatable rod extending from within said body vertically upward above said body, said polygon being mounted on said rod.

4. The toy of claim 3 wherein said polygon is a cube mounted closely over the top of said body and rotated one quarter turn for each advancement step, said means for rotating said cube comprises a ratchet on said rod, and a pawl movable with said disk advancing means and engaging said ratchet for turning said cube one quarter turn for each actuation.

5. The toy of claim 4 wherein said ratchet comprises a four cornered member and said pawl comprises a hook for engaging the corners of said four cornered member to make said quarter turn.

6. The toy of claim 1 including a lens arranged in said viewing aperture.

7. The toy of claim 6 including a translucent window arranged on the opposite side of said scenes from said lens.

8. The toy of claim 1 wherein said body is formed with a second viewing aperture extending therethrough, and a manually rotatable member mounted in said body to extend into said second viewing aperture, said member having different-colored, transparent regions for registry with said second viewing aperture.

9. The toy of claim 8 wherein said member has a toothed periphery, and resilient means mounted on said body engages said periphery to produce click sounds as said member is rotated.

10. The toy of claim 9 wherein said toothed periphery is provided with gaps for engagement by said resilient means for detenting said different-colored transparent regions of said member in said registry with said second viewing aperture.

11. The toy of claim 1 wherein said body is formed to define an aperture communicating with said disk within the perimeter of said disk, and wherein said disk is provided with a plurality of indicia for stepped registry with said aperture.

12. The toy of claim 1 wherein the front of said body is provided with a generally cylindrical housing simulating a lens housing, and wherein said housing is manually rotatable.

13. The toy of claim 12 including means for providing a plurality of click stop positions for said housing.

14. The toy of claim 1 wherein said disk is formed with a recess, and said scenes are formed on a film disk transparency secured in said recess.

15. The toy of claim 1 having a simulated camera lens comprising a transparent element having outer and inner surfaces of different curvatures, and a black, opaque member positioned behind said inner surface.

16. The toy of claim 15 wherein said outer surface is convexed and said inner surface is concave.

17. The toy of claim 15 wherein said black, opaque member comprises black paper.

18. A camera viewer toy comprising:
(a) a body configured to have the general size and shape of a camera;

(b) said body being formed with a viewing aperture extending therethrough;
(c) a rotatable disk mounted within said body;
(d) a plurality of viewable, transparent scenes arranged concentrically around said disk in the plane of said disk;
(e) means for advancing said disk in stepped rotation to bring successive ones of said scenes into registry with said viewing aperture for viewing;
(f) said advancing means comprising:
(1) an arm mounted for pivotal reciprocal motion in the region of said disk;
(2) a ratchet on the face of said disk in the central region of said disk;
(3) a pair of pawls integral with said arm and extending from said arm into engagement with said ratchet on opposite sides of the center of said disk for advancing said disk in said stepped rotation as said arm is pivoted;
(4) a plunger mounted for vertical motion within said body and extending above said body; and
(5) the lower end of said plunger being in sliding contact with the free end of said arm for sliding against and pivoting said arm as said plunger is depressed.

19. The toy of claim 18 wherein said free end of said arm is rounded, and said lower end of said plunger is flared for engagement with said rounded end.

20. The toy of claim 19 including stop means arranged on said body for engaging the upper surface of said flared lower end of said plunger to limit the upward travel of said plunger and said arm.

21. The toy of claim 20 including a spring engaging said arm and said camera body for biasing said free end of said arm upward.

22. The toy of claim 18 wherein said ratchet is formed on a face of said disk in the region of the axis thereof, and said pawls extend from said arm in generally parallel relation into engagement with said ratchet at respective opposite sides of said axis.

23. The toy of claim 22 wherein a spring engages said arm and said body for biasing said free end of said arm upward.

24. The toy of claim 23 including stop means for limiting the upward travel of said arm.

25. The toy of claim 24 wherein a pair of apertured studs are formed on said arm, and said spring comprises a resilient wire extending through each of said apertured studs and engaging said camera body.

26. The toy of claim 25 wherein said camera body includes a locating stud, said arm includes an abutment surface, one end of said spring is limited in its motion by said abutment surface, and the opposite end of said spring engages said locating stud.

27. The toy of claim 18 including a polygon mounted for rotation above said body; and means for interacting with said advancing means for rotating said polygon in stepped rotation with said disk.

28. The toy of claim 27 including a rotatable rod extending from within said body vertically upward above said body, said polygon being mounted on said rod.

29. The toy of claim 28 wherein said arm includes an extension, a ratchet is formed on said rod, and a pawl is formed on said extension for advancing said ratchet as said arm is pivoted.

30. The toy of claim 29 wherein said polygon is a cube mounted closely over the top of said body and rotated one quarter turn for each advancement step, said rod ratchet comprises a four cornered member on said rod, and said extension pawl comprises a hook movable with said arm for turning said four cornered member one quarter turn for each actuation of said arm.

31. The toy of claim 27 including a lens arranged in said viewing aperture, and a translucent window arranged on the opposite side of said scenes from said lens.

32. The toy of claim 31 wherein the front of said body is provided with a generally cylindrical housing simulating a lens housing, a simulated camera lens is secured within said lens housing, and said simulated lens comprises a transparent, concavo-convex element having inner and outer surfaces of different curvatures, and a black, opaque member positioned behind said concave surface.

33. The toy of claim 32 wherein said body is formed with a second viewing aperture extending therethrough, and a manually rotatable member is mounted in said body to extend into said second viewing aperture, said member having different-colored transparent regions for registry with said second viewing aperture.

34. The toy of claim 33 wherein said body is formed to define an aperture communicating with said disk within the perimeter of said disk, and wherein said disk is provided with a plurality of indicia for stepped registry with said aperture.

References Cited

UNITED STATES PATENTS

| | | |
|---|---|---|
| 2,570,913 | 10/1951 | Brown. |
| 2,584,912 | 2/1952 | Palmer _____________ 95—11 |
| 2,853,832 | 9/1958 | Arena _____________ 46—1 XR |
| 2,939,244 | 6/1960 | Grimes et al. _______ 46—1 XR |
| 3,026,640 | 3/1962 | Ogdon. |
| 3,090,158 | 5/1963 | Dixon _____________ 46—1 XR |
| 3,244,087 | 4/1966 | Anderson et al. _______ 95—11 |

F. BARRY SHAY, Primary Examiner

U.S. Cl. X.R.

40—70; 46—1, 192